(12) United States Patent
Chen

(10) Patent No.: US 8,128,141 B2
(45) Date of Patent: Mar. 6, 2012

(54) SAFETY HOOK FOR FALL ARREST SYSTEM

(75) Inventor: Zhi-Jia Chen, Changhua (TW)

(73) Assignee: Yoke Industrial Corp., Taichung (TW)

( * ) Notice: Subject to any disclaimer, the term of this patent is extended or adjusted under 35 U.S.C. 154(b) by 270 days.

(21) Appl. No.: 12/618,794

(22) Filed: Nov. 16, 2009

(65) Prior Publication Data

US 2011/0113602 A1    May 19, 2011

(51) Int. Cl.
*F16B 45/02* (2006.01)
*F16B 45/00* (2006.01)

(52) U.S. Cl. .................. 294/82.2; 24/599.5; 24/600.1; 24/599.7

(58) Field of Classification Search .............. 24/369, 24/377, 592.1, DIG. 51, 82.2, 599
See application file for complete search history.

(56) References Cited

U.S. PATENT DOCUMENTS

| | | | |
|---|---|---|---|
| 659,686 A * | 10/1900 | Mitchell | 24/599.4 |
| 679,088 A * | 7/1901 | Methven | 24/600.1 |
| 731,162 A * | 6/1903 | Carter | 24/600.1 |
| 1,530,010 A * | 3/1925 | Neilson | 294/82.2 |
| 1,879,168 A * | 9/1932 | Freysinger | 24/600.1 |
| 1,985,596 A * | 12/1934 | Burnham | 294/82.2 |
| 2,196,460 A * | 4/1940 | Hertel | 294/82.16 |
| 2,197,997 A * | 4/1940 | Dee | 294/82.2 |
| 5,579,564 A * | 12/1996 | Rullo et al. | 24/599.5 |
| 7,437,806 B2 * | 10/2008 | Lin | 24/599.5 |
| 7,757,360 B1 * | 7/2010 | Hong | 24/600.1 |
| 8,007,015 B2 * | 8/2011 | Coulombe | 292/1 |
| 8,015,676 B1 * | 9/2011 | Choate | 24/599.5 |
| 2008/0174130 A1 * | 7/2008 | Lin | 294/82.2 |
| 2008/0184540 A1 * | 8/2008 | Coulombe | 24/599.1 |
| 2009/0049663 A1 * | 2/2009 | Hong | 24/600.1 |

* cited by examiner

*Primary Examiner* — Jack W. Lavinder

(57) ABSTRACT

A safety hook includes a hook body comprising a recess at back of an intermediate portion, a locking dog at one end, a ring at the other end, and a front opening; a spring depressible latch member having a U section and comprising a plate interconnecting two side walls, the latch member being pivotably disposed on the back of the intermediate portion of the hook body with the plate being seated upon a flat portion of the recess; and a spring depressible lock member having a U section and comprising two side walls and a through hole on a groove portion. The lock member is pivotably disposed on a front side of the hook body with the side walls thereof partially straddled the hook body to be seated upon a portion of the plate. The locking dog is inserted into the through hole when the safety hook is locked.

1 Claim, 8 Drawing Sheets

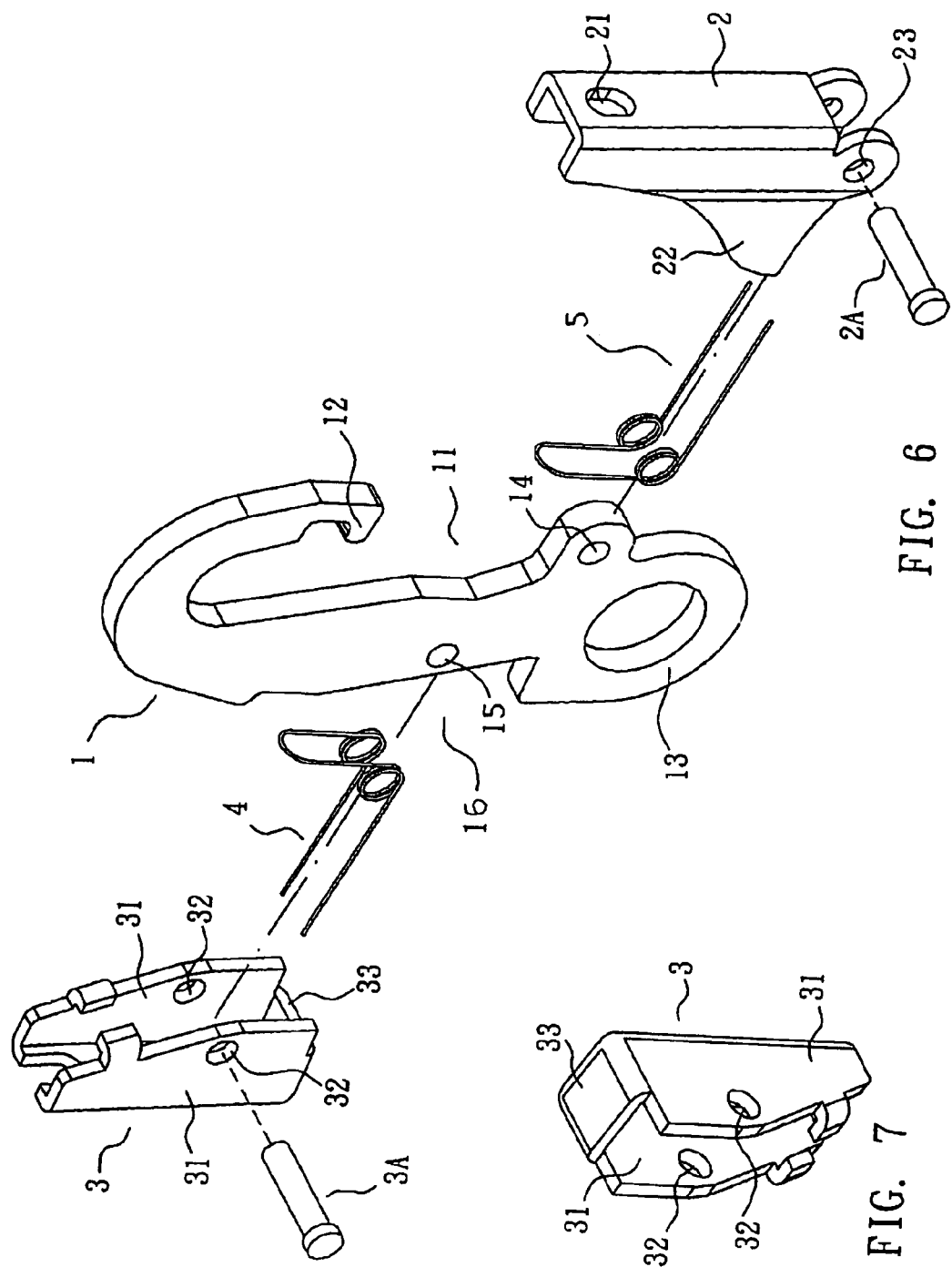

SAFETY HOOK FOR FALL ARREST SYSTEM

BACKGROUND OF THE INVENTION

1. Field of Invention

The invention relates to fall arrest systems and more particularly to a safety hook for fall arrest system with improved characteristics.

2. Description of Related Art

A great variety of systems are used for purposes of arresting a person's fall. A person working at dangerous heights may be supported by a lanyard looped around on his or her waist. The lanyard is attached to a ring of a safety hook by looping. The safety hook further has a hook portion so that one end of a steel wire can be releasably fastened at the hook portion and the other end thereof extends to secure to a proximate support structure. The safety hook thus can prevent the person from falling.

A conventional safety hook for fall arrest system is shown in FIGS. 1 to 5. The safety hook comprises a hook body A including a locking dog A5 at one end, a ring A6 at the other end for permitting a lanyard (not shown) to loop around, a first pivot A2 in an intermediate portion of the hook body A, a second pivot A3 proximate to the ring A6, an opening A1 between one end and the second pivot A3, and a recess A7 in the back of the intermediate portion of the hook body A opposite the opening A1.

The safety hook further comprises a groove-like latch member B of U cross-section at the back of the hook body A, a first torsion spring D mounted between an inner surface of a joining portion of the latch member B and the first pivot A2, and a pin B1 fixedly secured to the latch member B and slidably disposed in a slot A4 of the hook body A, the pin B1 having an enlarged head disposed externally of the latch member B so that the latch member B is pivotal about the first pivot A2.

The safety hook further comprises a lock member C. The lock member C is a groove-like member and has two substantially triangular side walls C2 partially straddle the intermediate portion of the hook body A. The lock member C is assembled with the hook body A by means of the second pivot A3. A second torsion spring E is mounted around the second pivot A3 between an inner surface of the groove portion of the lock member C and the intermediate portion of the hook body A so that the lock member C may be pivotal about the second pivot A3.

Each side wall C2 has a detent C3 at a corner. The detents C3 are rested upon the pin B1 when the safety hook is closed. A through hole C1 is formed on the groove portion of the lock member C distal the second pivot A3. The locking dog A5 is inserted into the through hole C1 when the safety hook is locked (see FIG. 4).

For opening the safety hook, a person may clockwise pivotably push an upper portion of the latch member B. Hence, the first torsion spring D is compressed (i.e., elastic energy being stored) and the pin B1 slides from one end of the slot A4 toward the other end thereof. The pushing will be stopped when the pin B1 reaches the other end of the slot A4 (see FIG. 5). The detents C3 are thus not stopped by the pin B1.

Next, the person may counterclockwise pivotably push the lock member C to disengage the through hole C1 from the locking dog A5 with the second torsion spring E being compressed (i.e., elastic energy being stored). The pushing will be stopped when the groove portion of the lock member C contacts the hook body A. As a result, the safety hook is open (see FIG. 5).

For closing the safety hook, the person may release the lock member C and the energized lock member C thus automatically returns to its locked position with the locking dog A5 inserted into the through hole C1. Next, the person may release the latch member B and the energized latch member B thus automatically returns to its locked position with the pin B1 being disposed at one end of the slot A4 (see FIG. 4).

However, the well known safety hook is disadvantageous because the hook opening and closing mechanism is complicated. It is often that the safety hook may jam after a short period time of use. This is not a safe design. Thus, the need for improvement still exists.

SUMMARY OF THE INVENTION

It is therefore one object of the invention to provide a safety hook for fall arrest system.

The above and other objects, features and advantages of the invention will become apparent from the following detailed description taken with the accompanying drawings.

BRIEF DESCRIPTION OF THE DRAWINGS

FIG. 6 is an exploded view of a first preferred embodiment of safety hook for fall arrest system according to the invention;

FIG. 7 is a perspective view of the latch member of FIG. 6;

DETAILED DESCRIPTION OF THE INVENTION

Figure 2:
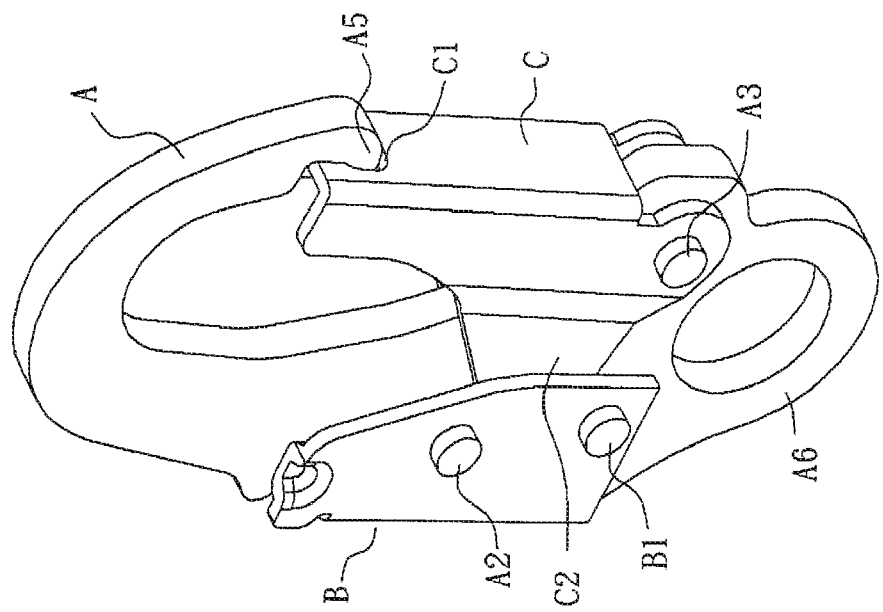
FIG. 2 is another perspective view of the safety hook but viewed from the opposite side.
Figure 3:
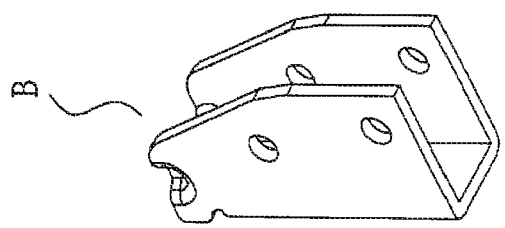
FIG. 3 is a perspective view of the latch member.
Figure 1:
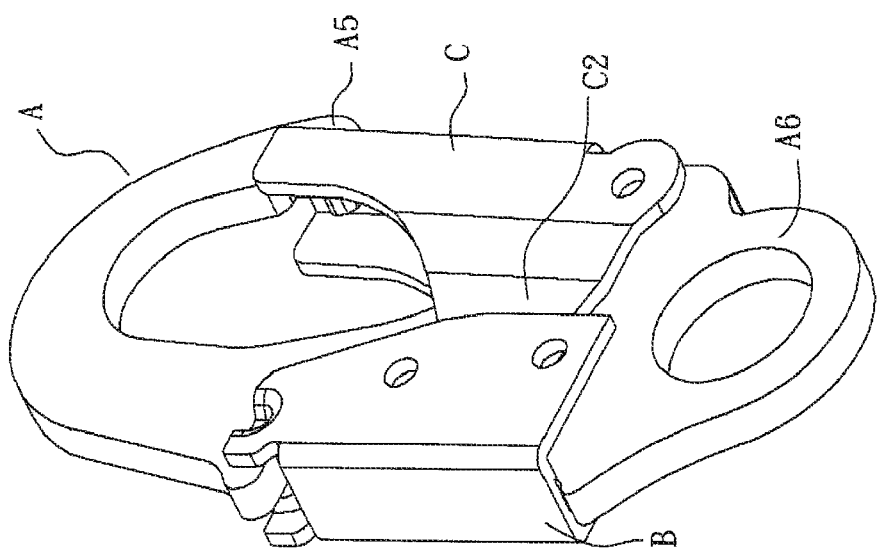
FIG. 1 is a perspective view of a conventional safety hook for fall arrest system where the safety hook is closed (i.e., locked)
Figure 4:
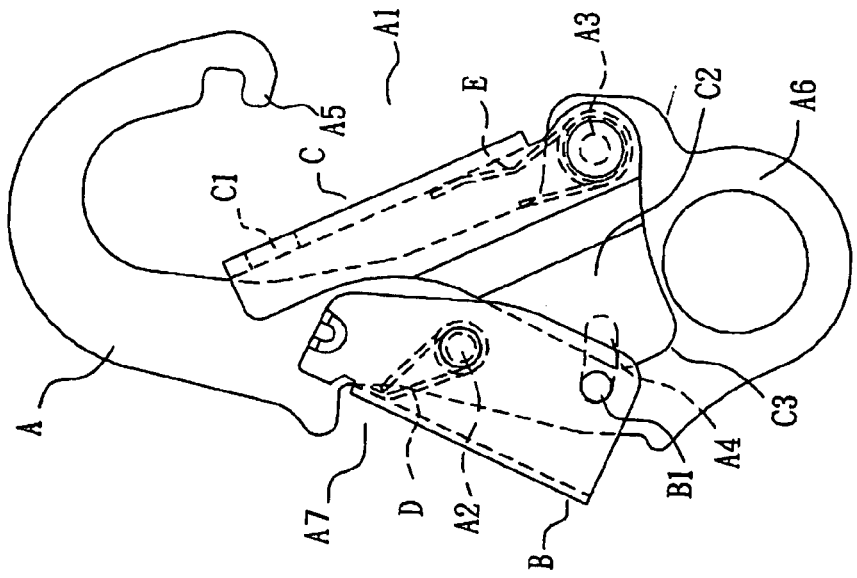
FIG. 4 is a side elevation of the safety hook of FIG. 2 in part phantom.
Figure 5:
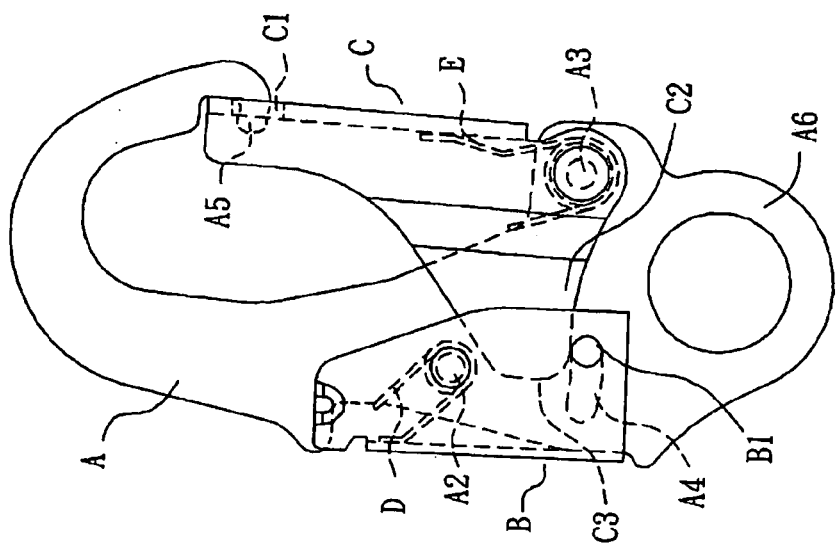
FIG. 5 is a view similar to FIG. 4 where the safety hook is open (i.e., unlocked)
Figure 8:
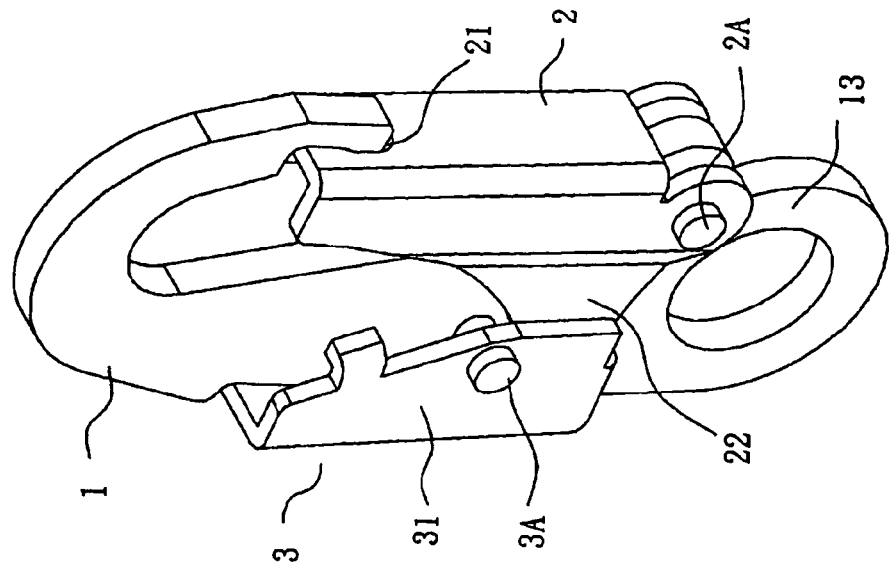
FIG. 8 is a perspective view of the assembled safety hook of FIG. 6 where the hook is closed (i.e., locked)
Figure 9:
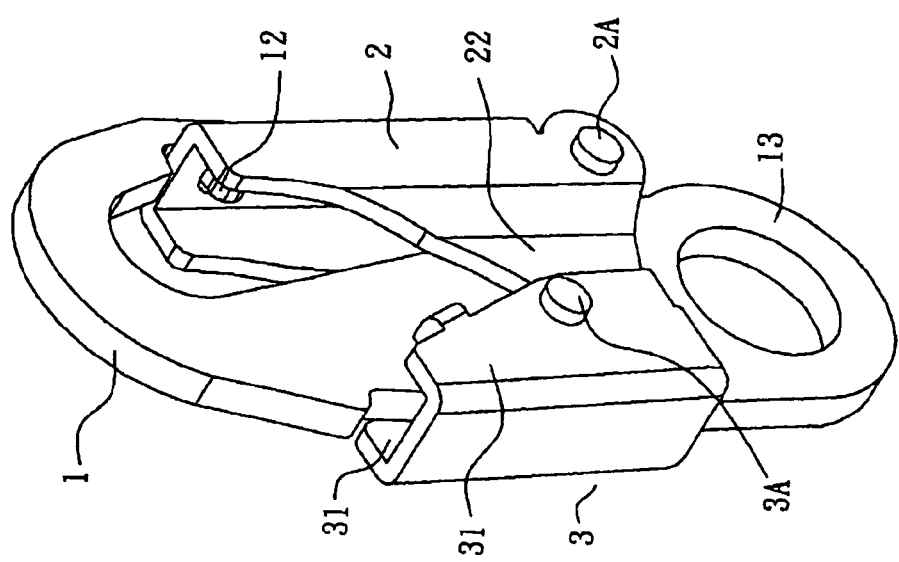
FIG. 9 is another perspective view of the safety hook shown in FIG. 8 but viewed from the opposite side.
Figure 10:
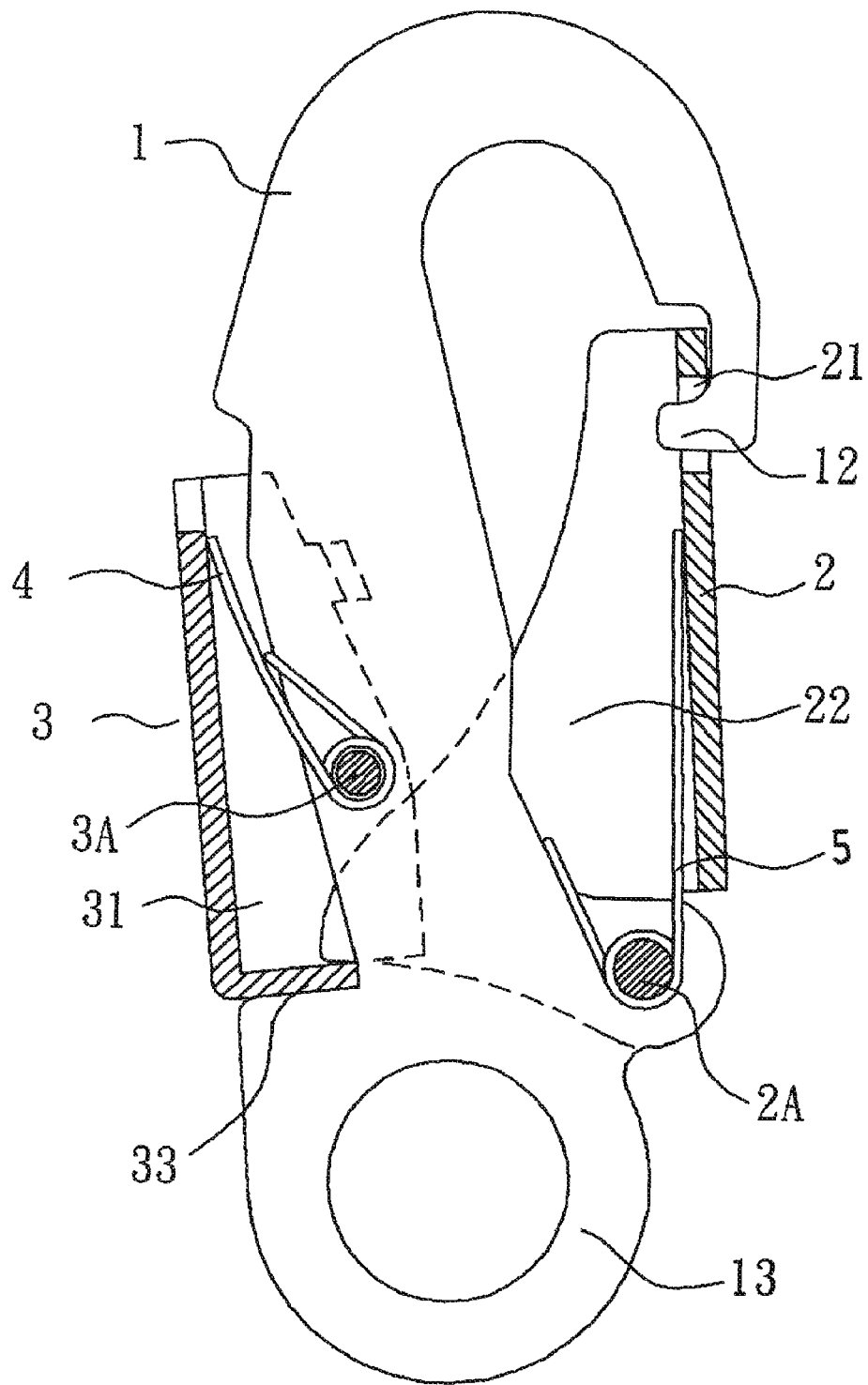
FIG. 10 is a side elevation of the safety hook of FIG. 9 in part phantom and section.
Figure 11:
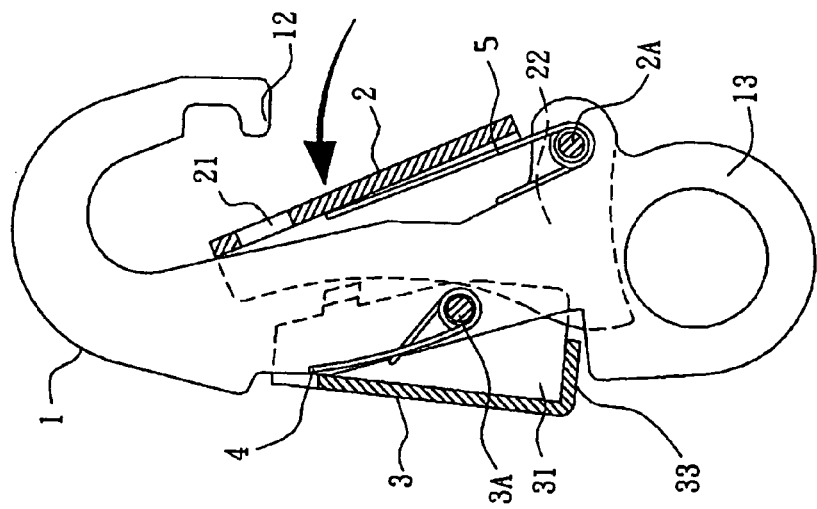
FIG. 11 is a view similar to FIG. 10 where the latch member is pivoted clockwise in a first step of unlocking the safety hook.
Figure 12:
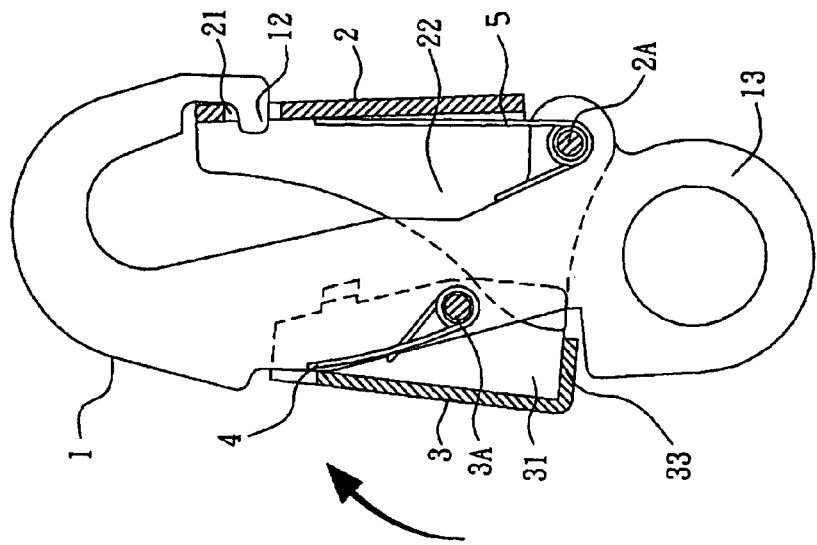
FIG. 12 is a view similar to FIG. 10 where the lock member is pivoted counterclockwise in a second final step of unlocking the safety hook.

Referring to FIGS. 6 to 12, a safety hook for fall arrest system in accordance with a first preferred embodiment of the invention comprises the following components as discussed in detail below.

A hook body 1 comprises a locking dog 12 at one end, a ring 13 at the other end for permitting a lanyard (not shown)

to loop around, a first pivot hole 14 proximate to the ring 13, a second pivot hole 15 in an intermediate portion of the hook body 1, an opening 11 between the locking dog 12 and the first pivot hole 14, and a recess 16 in the back of the intermediate portion of the hook body 1 opposite the opening 11.

A latch member 3 is a groove-like member and has a U-shaped cross-section. The latch member 3 comprises two side walls 31 each having a through hole 32, and a rectangular bottom plate 33 interconnecting the side walls 31.

A first pivot 3A is inserted through one through hole 32, one side of an L-shaped first torsion spring 4, the second pivot hole 15, and the other side of the first torsion spring 4 to have its end disposed in the other through hole 32 and its enlarged head urged against the mouth of one through hole 32 (i.e., the head of the first pivot 3A being disposed externally of the latch member 3). In this position, the bottom plate 33 is seated upon a flat bottom portion of the recess 16, one end of the first torsion spring 4 is urged against a bottom of a groove portion of the latch member 3, the intermediate portion of the hook body 1 is partially received in the latch member 3, and the latch member 3 is pivotal about the first pivot 3A.

A lock member 2 has a groove-like shape and comprises two substantially triangular side walls 22, a through hole 21 on a bottom of a groove portion in proximity to one end, and two opposite pivot holes 23 at the other end distal the through hole 21.

A second pivot 2A is inserted through one pivot hole 23, one side of an L-shaped second torsion spring 5, the first pivot hole 14, and the other side of the second torsion spring 5 to have its end disposed in the other pivot hole 23 and its enlarged head urged against the mouth of one pivot hole 23 (i.e., the head of the second pivot 2A being disposed externally of the lock member 2). In this locked position, the side walls 22 partially straddle the intermediate portion of the hook body 1 to be seated upon a portion of the bottom plate 33, the locking dog 12 is inserted into the through hole 21, and the lock member 2 is pivotal about the second pivot 2A.

For opening the safety hook, a person may clockwise pivotably push an upper portion of the latch member 3. Hence, the first torsion spring 4 is compressed (i.e., elastic energy being stored) to disengage the bottom plate 33 from the flat bottom portion of the recess 16 until the bottom plate 33 is further disengaged from the side walls 22. The side walls 22 (i.e., the lock member 2) are thus unlocked (see FIG. 11).

Next, the person may counterclockwise pivotably push the lock member 3 to disengage the through hole 21 from the locking dog 12 with the second torsion spring 5 being compressed (i.e., elastic energy being stored). The pushing will be stopped when the groove portion of the lock member 2 contacts the hook body 11. As a result, the safety hook is open (see FIG. 12).

For closing the safety hook, the person may release the lock member 2 and the energized lock member 2 thus automatically returns to its locked position with the locking dog 12 inserted into the through hole 21. Next, the person may release the latch member 3 and the energized latch member 3 thus automatically returns to its locked position (see FIG. 10).

Figure 13:
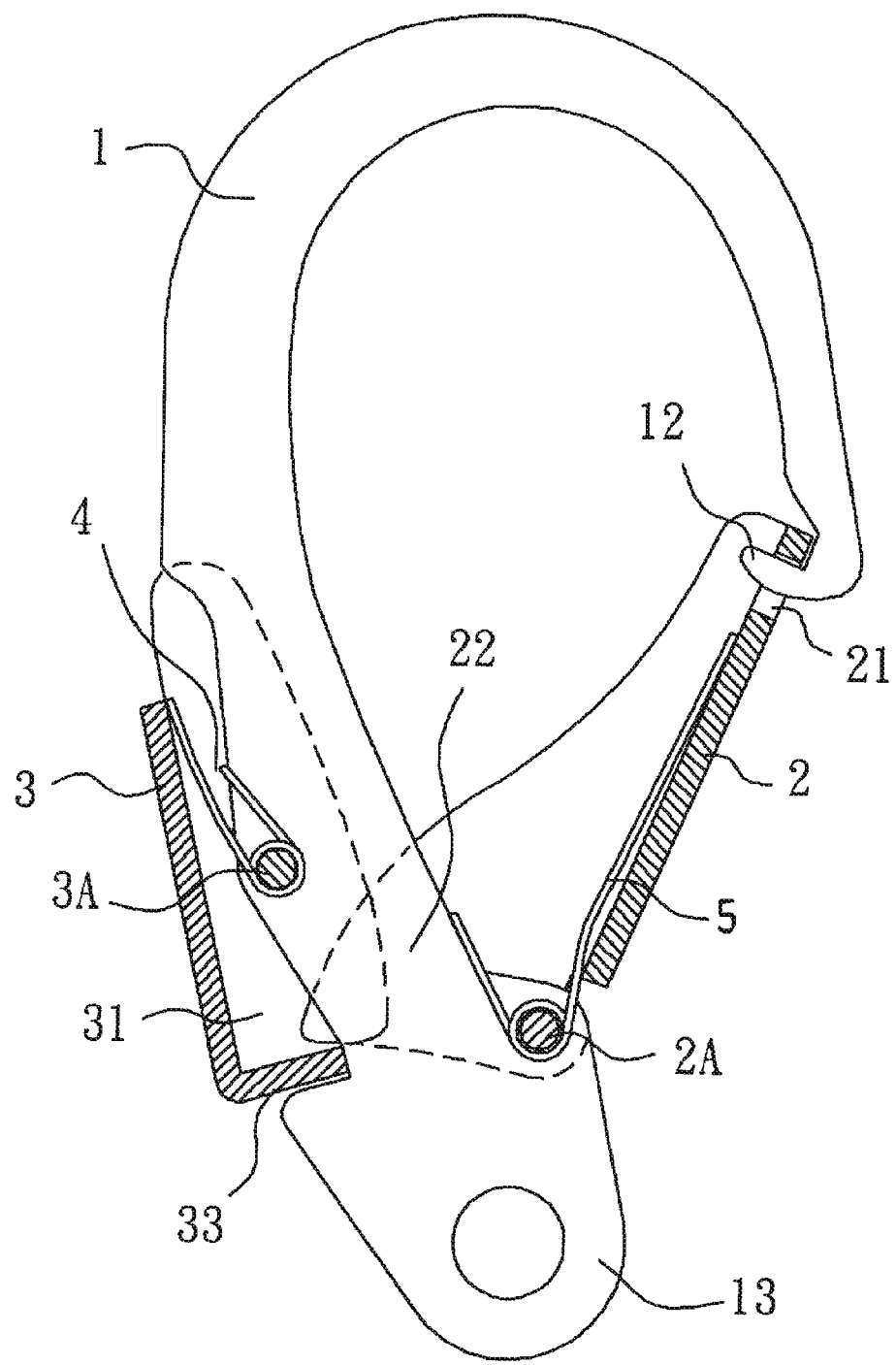
FIG. 13 is a side elevation of a second preferred embodiment of safety hook for fall arrest system according to the invention in part phantom and section.
Figure 14:
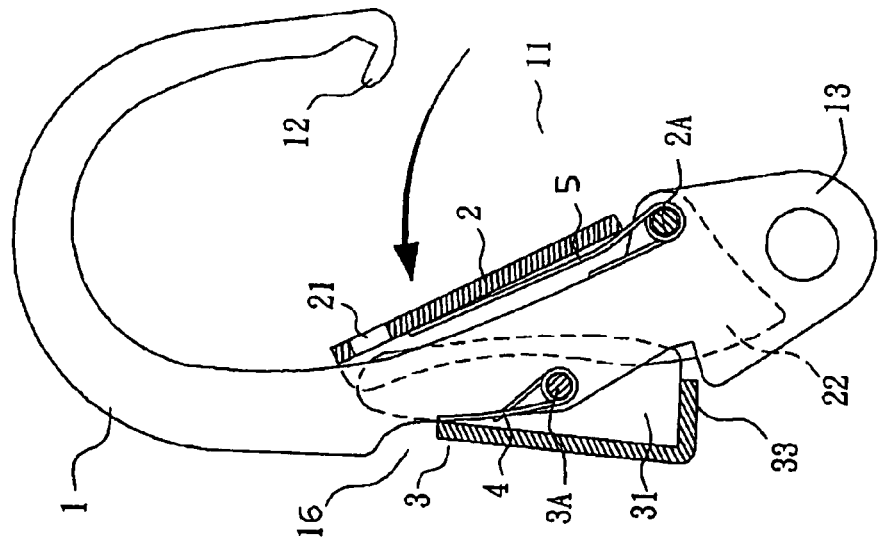
FIG. 14 is a view similar to FIG. 13 where the latch member is pivoted clockwise in a first step of unlocking the safety hook.
Figure 15:
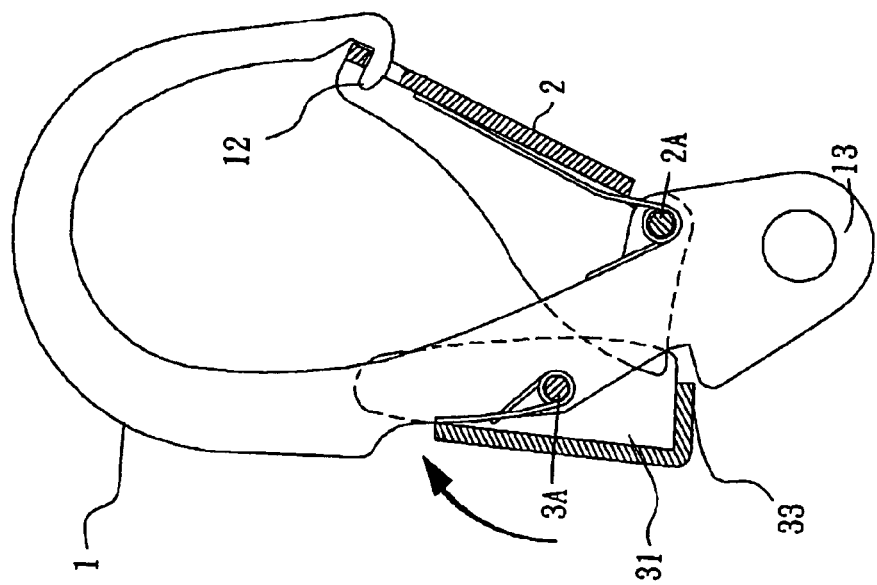
FIG. 15 is a view similar to FIG. 13 where the lock member is pivoted counterclockwise in a second final step of unlocking the safety hook.

Referring to FIGS. 13 to 15, a safety hook for fall arrest system in accordance with a second preferred embodiment of the invention is shown. The characteristics of the second preferred embodiment are detailed below. The shapes of the hook body 11, the latch member 3, and the lock member 2 are different from that shown in the first embodiment. The locking and unlocking operations of the safety hook are the same as those described in the first embodiment. Therefore, a detailed description thereof is deemed unnecessary.

While the invention herein disclosed has been described by means of specific embodiments, numerous modifications and variations could be made thereto by those skilled in the art without departing from the scope and spirit of the invention set forth in the claims.

What is claimed is:

1. A safety hook for a fall arrest system comprising:
   a hook body comprising a locking dog at one end, a ring at the other end, an opening between the locking dog and the ring, and a recess at a first side of an intermediate portion of the hook body opposite the opening;
   a spring depressible latch member having a U-shaped cross-section and comprising a plate interconnecting two side walls, the latch member being pivotably disposed on the first side of the intermediate portion of the hook body with the plate being seated upon a flat portion of the recess; and
   a spring depressible lock member having a U-shaped cross-section and comprising two substantially triangular side walls and a through hole on a groove portion, the lock member being pivotably disposed on a second side of the intermediate portion of the hook body opposite the recess with the side walls thereof partially straddled the intermediate portion of the hook body to be seated upon a portion of the plate and the locking dog inserted into the through hole,
   whereby clockwise pivoting the latch member will disengage the plate from both the flat portion of the recess and the side walls the lock member; and counterclockwise pivoting the lock member will disengage the through hole from the locking dog.

* * * * *